(12) United States Patent
Keel

(10) Patent No.: US 8,376,378 B2
(45) Date of Patent: Feb. 19, 2013

(54) SELF-PROPELLED VEHICLE AND ARTICULATED STEERABLE MOBILE CHASSIS THEREOF

(75) Inventor: Andrew Keel, Duluth, GA (US)

(73) Assignee: Performance Concepts, Inc., Duluth, GA (US)

( * ) Notice: Subject to any disclaimer, the term of this patent is extended or adjusted under 35 U.S.C. 154(b) by 538 days.

(21) Appl. No.: 12/589,833

(22) Filed: Oct. 28, 2009

(65) Prior Publication Data

US 2010/0108423 A1  May 6, 2010

Related U.S. Application Data

(60) Provisional application No. 61/111,322, filed on Nov. 4, 2008.

(51) Int. Cl.
B62K 21/00 (2006.01)
B62K 19/00 (2006.01)
B62K 11/04 (2006.01)
B62M 7/02 (2006.01)

(52) U.S. Cl. .................. 280/87.042; 180/227
(58) Field of Classification Search ............ 280/265, 280/87.042, 266; 180/227, 219
See application file for complete search history.

(56) References Cited

U.S. PATENT DOCUMENTS

| 1,184,321 A | * | 5/1916 | Chapin ..................... 280/270 |
| 3,269,480 A | * | 8/1966 | Kirby ........................ 180/225 |
| 3,620,547 A | * | 11/1971 | Vaverek ................ 280/87.042 |
| 3,876,217 A | | 4/1975 | Copier |
| 4,073,356 A | * | 2/1978 | Schlicht ..................... 180/181 |
| 4,106,786 A | | 8/1978 | Talbott |
| 4,132,435 A | | 1/1979 | Wilson |
| 4,645,223 A | * | 2/1987 | Grossman ................ 280/11.28 |
| 5,107,950 A | * | 4/1992 | Horiike et al. ................ 180/219 |
| 5,160,155 A | | 11/1992 | Barachet |
| 5,513,865 A | | 5/1996 | Brooks et al. |
| 5,580,089 A | | 12/1996 | Kolka |
| 5,826,674 A | | 10/1998 | Taylor |
| 5,860,657 A | | 1/1999 | Kroher |
| 5,927,735 A | | 7/1999 | Hosoda |
| 5,984,328 A | | 11/1999 | Tipton |
| 5,997,018 A | | 12/1999 | Lee |
| 6,241,264 B1 | | 6/2001 | Page |

(Continued)

FOREIGN PATENT DOCUMENTS

FR  2547264 A1 * 12/1984
GB  2249064 A  * 4/1992

OTHER PUBLICATIONS

PCT International Search Report & Written Opinion dated Jan. 4, 2010 in PCT International Application No. PCT/US 09/05877 filed Oct. 28, 2009—11 pages.

Primary Examiner — James Kramer
Assistant Examiner — Wesley Potter
(74) Attorney, Agent, or Firm — John R. Flanagan

(57) ABSTRACT

An articulated steerable self-propelled vehicle has a support platform mounting a motive power source and sites at opposite sides of motive power source where an operator's feet can be placed to enable the operator to stand on platform and straddle motive power source. First suspension assembly on vehicle is pivotally mounted to platform in order to dispose and couple first ground surface contacting member spaced in first direction from platform, movable to follow the ground surface, vertically movable relative to platform to accommodate impact generated by uneven ground surface, and steerable horizontally relative to platform and the ground surface. Second support assembly on the vehicle is pivotally mounted to platform in order to dispose and couple second ground surface contacting member spaced in second direction from of platform, movable to follow the ground surface, and vertically movable relative to platform to accommodate impact generated by uneven ground surface.

24 Claims, 7 Drawing Sheets

U.S. PATENT DOCUMENTS

| | | |
|---|---|---|
| 6,263,994 B1 * | 7/2001 | Eitel .............................. 180/219 |
| 6,341,786 B1 * | 1/2002 | Kermis ....................... 280/14.22 |
| 6,398,237 B1 | 6/2002 | Attey |
| 6,435,290 B1 * | 8/2002 | Justus et al. .................... 180/9.1 |
| 6,488,295 B1 | 12/2002 | Bryant |
| 6,640,922 B2 * | 11/2003 | Nakagawa .................... 180/227 |
| 6,676,138 B1 * | 1/2004 | Rosso ...................... 280/11.221 |
| 6,832,765 B1 | 12/2004 | Walton |
| 6,832,771 B2 | 12/2004 | Beck |
| 6,926,294 B2 | 8/2005 | Lewis |
| 7,147,235 B2 | 12/2006 | West |
| 2002/0067015 A1 | 6/2002 | Tierney et al. |
| 2005/0139406 A1 | 6/2005 | McLeese |
| 2007/0169978 A1 | 7/2007 | Patmont et al. |
| 2007/0182123 A1 | 8/2007 | Bryant |
| 2007/0257459 A1 | 11/2007 | Gang |

* cited by examiner

SELF-PROPELLED VEHICLE AND ARTICULATED STEERABLE MOBILE CHASSIS THEREOF

This patent application claims the benefit of U.S. provisional application No. 61/111,322 filed Nov. 4, 2008. The disclosure of said provisional application is hereby incorporated herein by reference thereto.

TECHNICAL FIELD

The present invention generally relates to vehicles and, more particularly, is concerned with a self-propelled vehicle and an articulated steerable mobile chassis thereof.

BACKGROUND ART

Traditional off-road vehicles, such as conventional all-terrain vehicles or ATVs, typically employ four wheels for traction and stability, utilize a manually-turned wheel for steering, and accommodate a rider in a seated position. Though some have a chassis with articulated wheel assemblies that accommodate impacts from use on varying off-road surfaces, their size, footprint and width limit their versatility in backcountry terrain as a transportation vehicle.

The inventor herein has perceived that there is a pressing need for a vehicle having a versatility of capabilities that would allow its use as a suitable transportation vehicle under the diversity of varying conditions experienced in a variety of terrains and environments. One motorized skateboard vehicle, disclosed in U.S. Pat. No. 7,147,235, has sought to fulfill this need but appears to fall far short in terms of various factors, such as vehicle balance, impact absorption, steerability and maneuverability.

A need still remains for a vehicle that will provide a satisfactory transportation vehicle for the diversity of varying conditions of off-road, backcountry terrain.

SUMMARY OF THE INVENTION

The present invention provides a vehicle and chassis thereof designed to satisfy the aforementioned need. The vehicle of the present invention provides a satisfactory transportation vehicle for off-road, backcountry use. The chassis of the vehicle employs features that enable it to become a satisfactory transportation vehicle. The vehicle is propelled by a motive power source, such as an engine or motor, and steered merely by shifting and applying the distribution of the operator's weight on the platform of the vehicle. The vehicle has only two ground surface contacting members, placed one in front of the other, and employs an articulating suspension arrangement regulated by shock absorbers to maintain its chassis in an erect operating mode.

Accordingly, the present invention is directed to an articulated steerable mobile chassis for a vehicle which includes a support platform, a first ground surface contacting member, a second ground surface contacting member, a first suspension assembly, and a second suspension assembly. The support platform provides sufficient space for mounting a motive power source.

The first suspension assembly is pivotally mounted to, and extends forwardly of, the support platform. The first suspension assembly thus articulately connects the support platform to the first ground surface contacting member at a location spaced fore of the support platform so as to vertically suspend the support platform with respect to the first ground surface contacting member. The first suspension assembly thereby enables the first ground surface contacting member to dynamically engage the ground surface. It also supports the first ground surface contacting member to be steerable horizontally relative to the support platform and the ground surface.

The second suspension assembly is pivotally mounted to, and extends rearwardly of, the support platform. The second support assembly thus articulately connects the support platform to the second ground surface contacting member at a location spaced aft of the support platform so as to vertically suspend the support platform with respect to the second ground surface contacting member. The second suspension assembly thereby enables the second ground surface contacting member to dynamically engage the ground surface. It also supports the second ground surface contacting member to be movable relative to the ground surface.

The first and second suspension assemblies also respectively support the first and second ground surface contacting members to be vertically movable with the first and second suspension assemblies relative to the support platform so as to dynamically suspend the support platform at a given position spaced above the ground surface and thus place the vehicle in an erect operating mode. The first and second suspension assemblies can undergo independent vertical deflection within a given range relative to the support platform to thereby allow the first and second ground surface contacting members to follow uneven ground surface as the first and second suspension assemblies absorb impacts generated therefrom and the support platform temporarily moves to positions closer to and farther from the ground surface than the given position.

Also, the support platform has sites at opposite sides of the motive power source space where an operator's feet can be placed to enable the operator to mount the support platform and to actuate the steering of the first ground surface contacting member.

The present invention is also directed to articulated steerable mobile chassis as set forth above in which the first ground surface contacting member is a rotatably mounted wheel and the second ground surface contacting member also is a rotatably mounted wheel.

The present invention is further directed to an articulated steerable self-propelled vehicle which includes the articulated steerable mobile chassis as set forth above in which a motive power source is mounted on the support platform and an operator-interfaced arrangement extends between and couples the motive power source and the second ground surface contacting member so as to enable control of transmission of power to and motion by the second ground contacting member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1A is a side elevational view of a hand-held remote control device of the vehicle of FIG. 1.

DETAILED DESCRIPTION OF THE INVENTION

Figure 1:
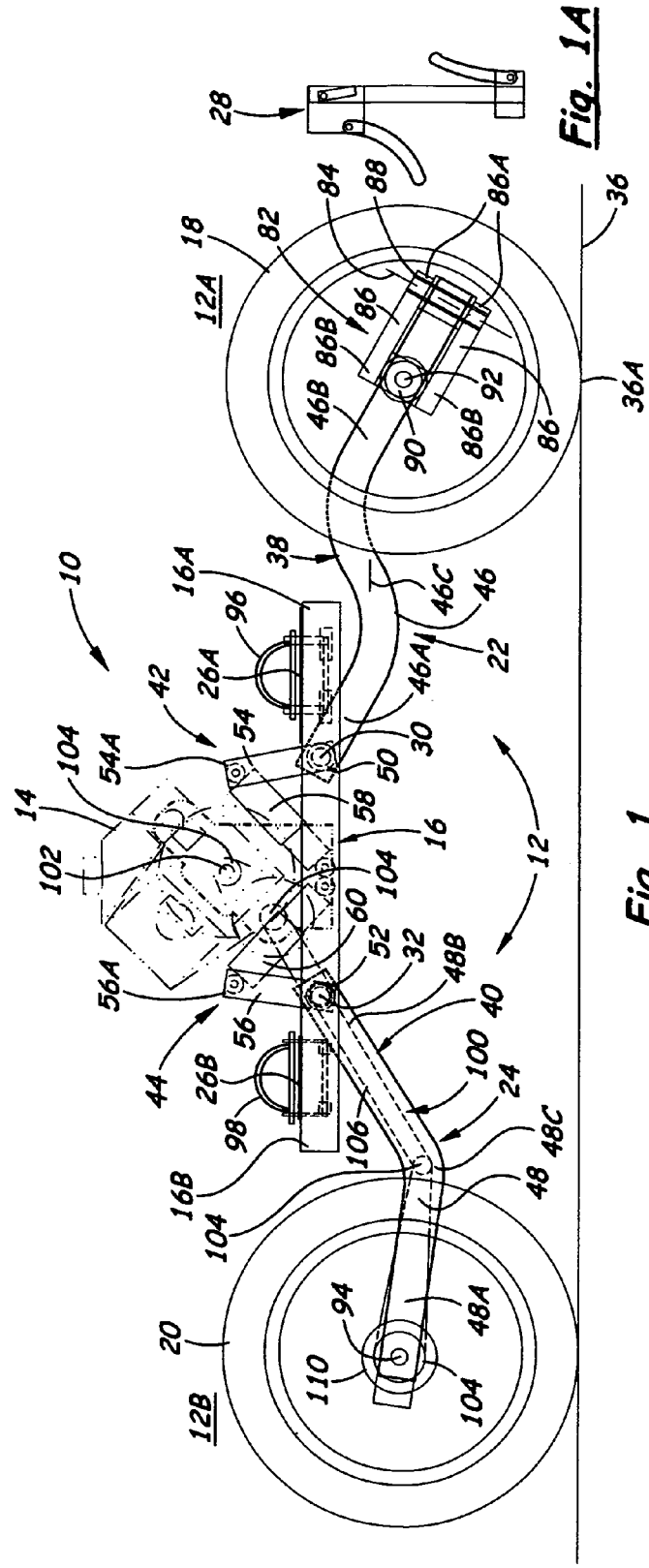
FIG. 1 is a side elevational view of a first exemplary embodiment of a steerable self-propelled vehicle in accordance with the present invention.
Figure 2:
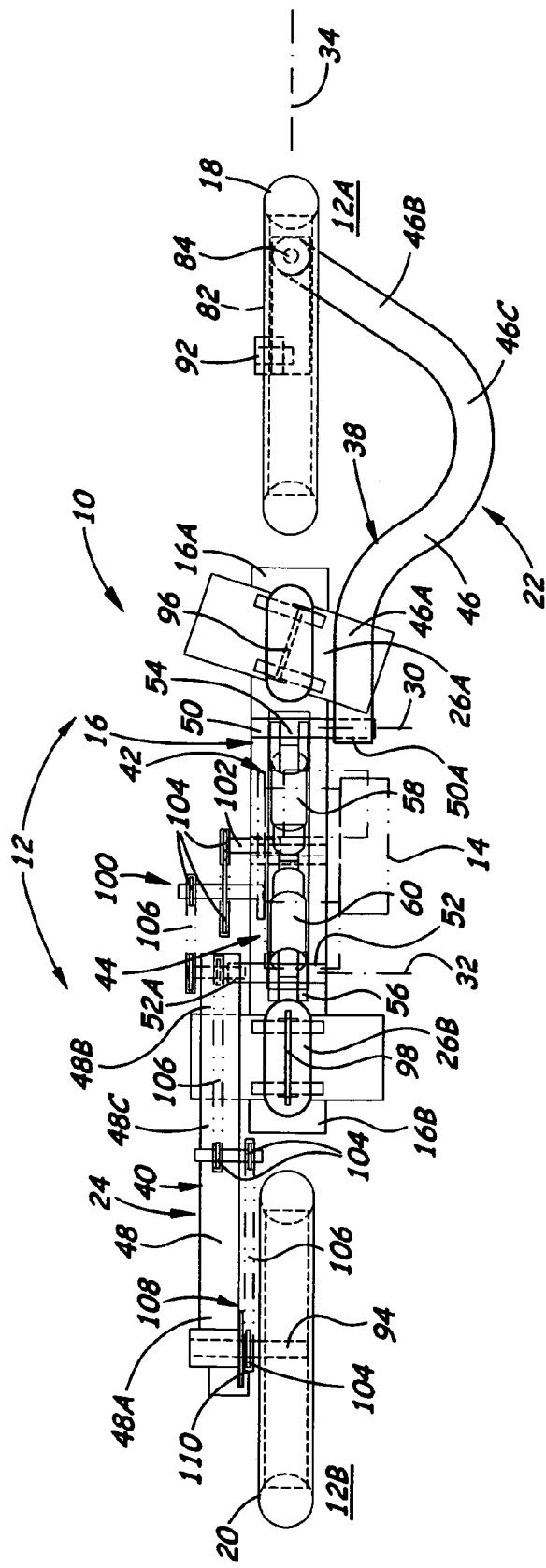
FIG. 2 is a top plan view of the vehicle of FIG. 1.
Figure 6:
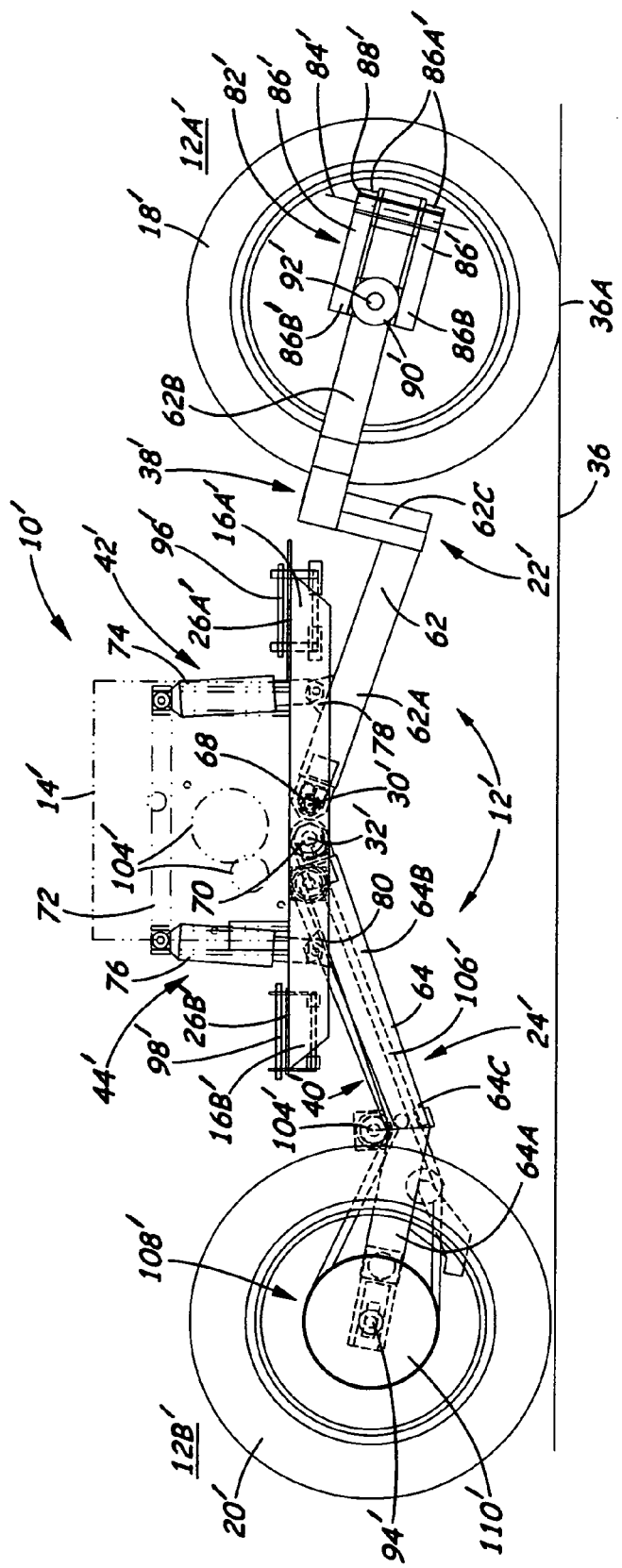
FIG. 6 is a side elevational view of a second exemplary embodiment of the steerable self-propelled vehicle in accordance with the present invention.
Figure 7:
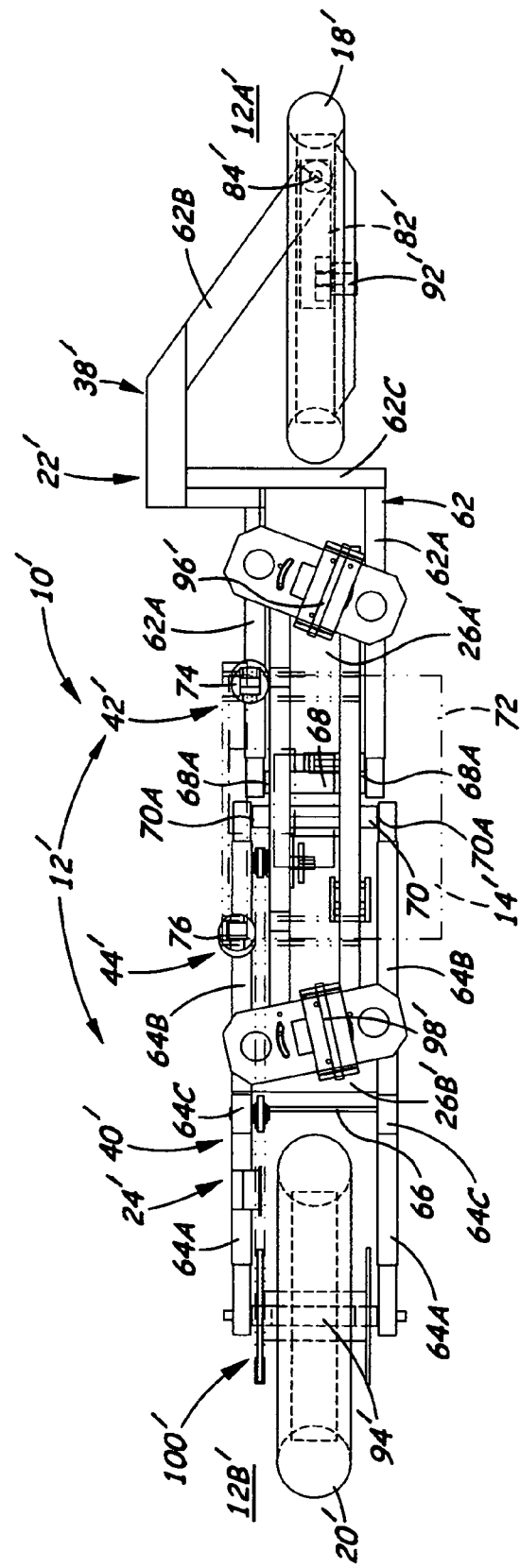
FIG. 7 is a top plan view of the vehicle of FIG. 6.

Referring to the drawings and particularly to FIGS. 1 and 2, there is illustrated a first exemplary embodiment of an articulated steerable self-propelled vehicle, generally designated 10, in accordance with the present invention. In FIGS. 6 and 7, there is illustrated a second exemplary embodiment of the vehicle 10, in accordance with the present invention. It should be understood "front" and "rear" and "forward" and "backward" are used for purposes of convenience and not to be construed as limiting terms. Also, it will be recognized that many of the same reference numbers are used hereinafter in the description of the first and second embodiments. These reference numbers as seen in FIGS. 6 and 7 with respect to the second embodiment have added to them a prime symbol to indicate that they designate assemblies and components structurally different, but functionally similar, to those of the first embodiment seen in FIGS. 1 and 2.

Referring to FIGS. 1, 2, 6 and 7, the self-propelled vehicle 10 of both exemplary embodiments includes an articulated steerable mobile chassis, generally designated 12, and a motive power source 14. The chassis 12 includes a support platform 16, a front ground surface contacting member 18, a rear ground surface contacting member 20, a front articulating suspension assembly 22, and a rear articulating suspension assembly 24. The support platform 16 is located generally intermediate between front and rear ends 12A, 12B of the chassis 12 and provides sufficient space to mount the motive power source 14 thereon and provide sites 26A, 26B for the operator to stand on the support platform 16. The vehicle 10 further includes an operator-interfaced arrangement extending between and coupling the motive power source 14 and the rear ground surface contacting member 20 so as to enable control of transmission of power to and motion by the rear ground contacting member 20.

The front and rear suspension assemblies 22, 24 of the chassis 12 are mounted to the support platform 16 respectively adjacent to front and rear end portions 16A, 16B thereof for undergoing, independent of one another, pivotal movement relative to the support platform 16 about respective front and rear pivotal axes 30, 32 extending substantially transverse relative to a fore-and-aft extending or longitudinal axis 34 of the vehicle 10, as seen in FIGS. 2 and 7. The front and rear pivotal axes 30, 32 extend substantially parallel to one another. The front suspension assembly 22 extends forwardly of the front end portion 16A of the support platform 16 along the longitudinal axis 34 of the vehicle 10. The rear suspension assembly 24 extends rearwardly of the rear end portion 16B of the support platform 16 along the longitudinal axis 34 of the vehicle 10. The front and rear suspension assemblies 22, 24 respectively articulately connect the support platform 16 to the front and rear ground surface contacting members 18, 20 so as to vertically suspend the support platform 16 with respect to the front and rear ground surface contacting members 18, 20 at a given position spaced above the ground surface 36 and thus place the vehicle 10 in an erect operating mode, as seen in FIGS. 1 and 6, with the front and rear ground surface contacting members 18, 20 engaged with the ground surface.

Figure 3:
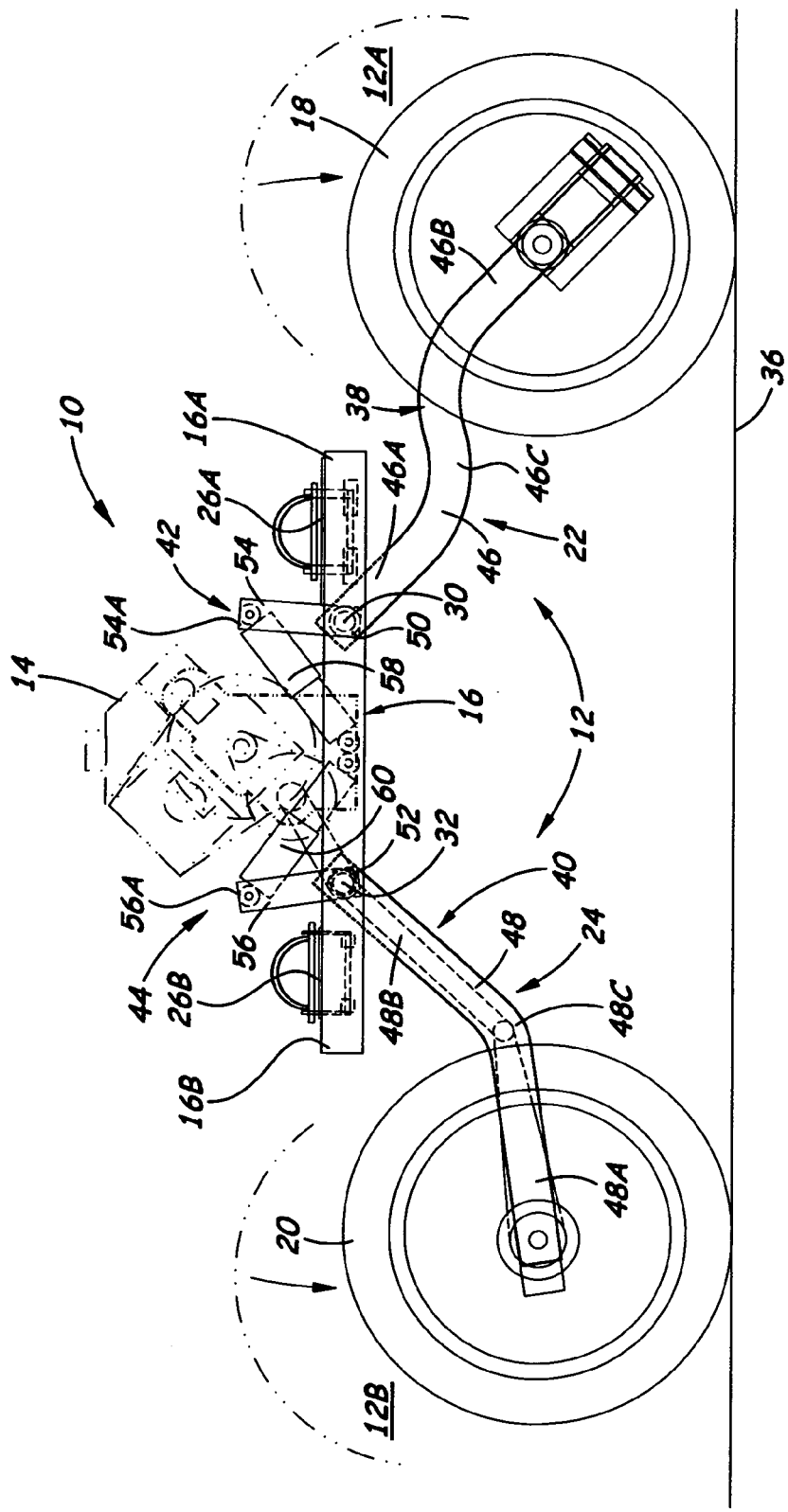
FIG. 3 is a side elevational view of the vehicle of FIG. 1 showing a range of pivotal movement of front and rear articulating suspension assemblies of the vehicle above a given position of a support platform of the vehicle.
Figure 4:
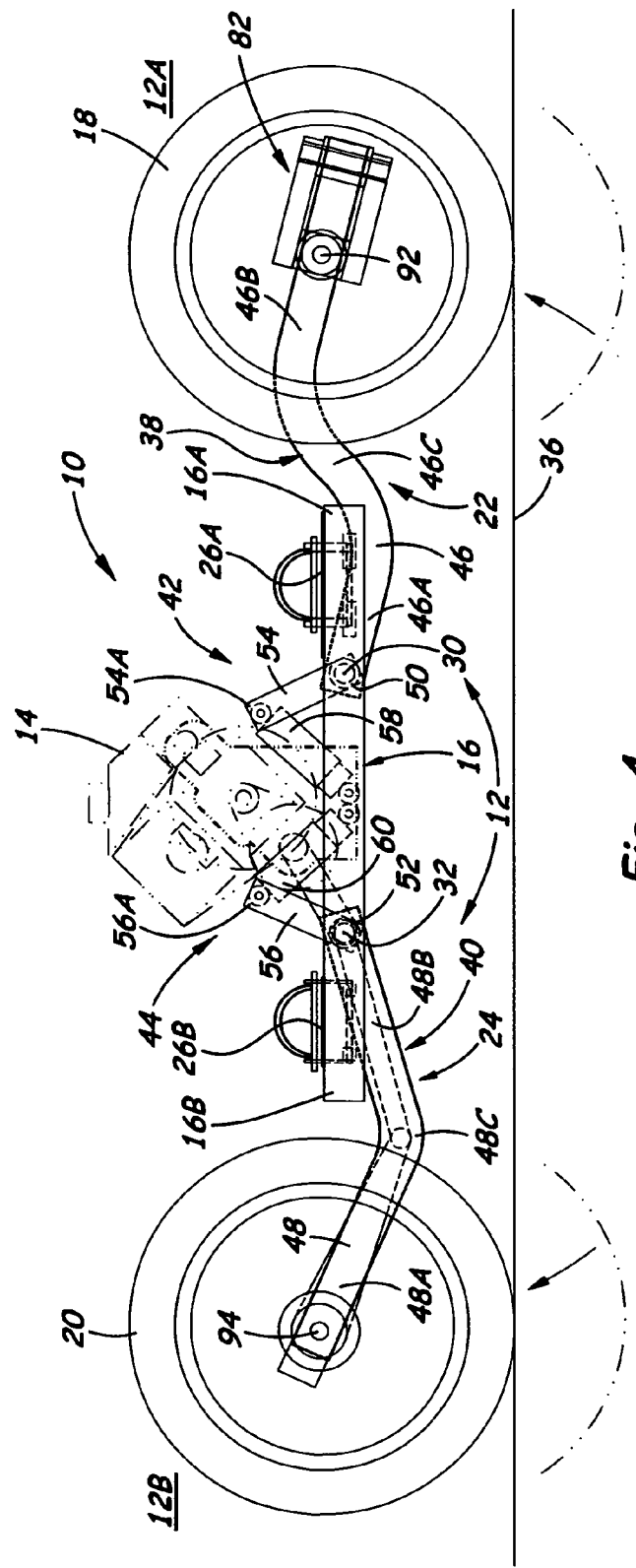
FIG. 4 is a side elevational view similar to that of FIG. 3 now showing a range of pivotal movement of the front and rear articulating suspension assemblies of the vehicle below the given position of the support platform of the vehicle.

The front and rear suspension assemblies 22, 24 respectively support the respective front and rear ground surface contacting members 18, 20 so as to be vertically movable, independently of one another, with the front and rear suspension assemblies 22, 24 and relative to the support platform 16. In such manner, the front and rear suspension assemblies 22, 24, together with the front and rear ground surface contacting members 18, 20, dynamically suspend the support platform 16 at the given position spaced above the ground surface 36 and thus place the vehicle 10 in the erect operating mode. In such erect operating mode of the vehicle 10, the front and rear articulating suspension assemblies 22, 24 can undergo independent vertical deflection within a given range relative to the support platform 16 which is sufficient to allow the front and rear ground surface contacting members 18, 20 to follow uneven ground surface as the front and rear suspension assemblies 22, 24 absorb impacts generated therefrom and the support platform 16 temporarily moves to positions closer to and farther from the ground surface 36 than the given position, as shown in FIGS. 3 and 4.

In furtherance of this capability of the front and rear suspension assemblies 22, 24 to dynamically support and suspend the support platform 16 at the given position seen in FIGS. 1 and 6, the front and rear suspension assemblies 22, 24 of both exemplary embodiments respectively include forward and rearward suspension structures 38, 40 and front and rear lift generating mechanisms 42, 44. The front and rear lift generating mechanisms 42, 44 permit the independent vertical deflection of the forward and rearward suspension structures 38, 40 within the given range relative to the support platform 16 that is sufficient to allow the front and rear lift generating mechanisms 42, 44 independently of one another to absorb impacts generated by uneven ground surface and the support platform 16 to move temporarily to positions closer to and farther from the ground surface 36 than the given position as the front and rear ground surface contacting members 18, 20 follow the uneven ground surface.

Referring to FIGS. 1 and 2, in the first exemplary embodiment of the vehicle 10, the forward and rearward suspension structures 38, 40 of the front and rear suspension assemblies 22, 24 take the form of respective elongated single front and rear arms 46, 48 having opposite rearward and forward end portions 46A, 48A and 46B, 48B. The single front and rear arms 46, 48 at their respective rearward end portion 46A and forward end portion 48B are pivotally mounted to the support platform 16 via fixed attachments to outer ends 50A, 52A of respective front and rear cross shafts 50, 52 of the front and rear suspension assemblies 22, 24. The front and rear cross shafts 50, 52, which respectively define the front and rear pivotal axes 30, 32, are rotatably mounted to the support platform 16 at transverse locations between the space provided for the motive power source 14 and the forward and rearward sites 26A, 26B for receiving the feet of the operator. The single front arm 46 extends forward from the front cross shaft 50 to its forward end portion 46B. The single rear arm 48 extends rearward from the rear cross shaft 52 to its rearward end portion 48A. In response to the front and rear ground surface contacting members 18, 20 encountering uneven terrain, and independent of one another, the single front arm 46 at its forward end portion 46B and the single rear arm 48 at its rearward end portion 48A are moved vertically as the front and rear cross shafts 50, 52 are rotated about the front and rear pivotal axes 30, 32 relative to the support platform 16. The rearward and forward end portions 46A, 46B of the single front arm 46 have respective substantially straight configurations and are rigidly interconnected by an intermediate portion 46C which has a substantially curved angular configuration. The forward and rearward end portions 48B, 48A of the single rear arm 48 have respective substantially straight configurations and are rigidly interconnected by an intermediate portion 48C which has a substantially shallow V-shaped configuration.

The front and rear lift generating mechanisms 42, 44 of the respective front and rear suspension assemblies 22, 24 respectively pivotally couple the forward and rearward suspension structures 38, 40 (the single front and rear arms 46, 48 via the front and rear cross shafts 50, 52) to the support platform 16. The pivotal couplings allow the support platform 16 to be urged into and assume the given position spaced above ground surface 36 while being yieldable to permit independent vertical pivotal movement of each of the front and rear suspension structures 38, 40 within the given range relative to the support platform 16, as seen in FIGS. 3 and 4. The front and rear lift generating mechanisms 42, 44 respectively include front and rear crank arms 54, 56 fixedly attached to and extending radially upward from the respective front and rear cross shafts 50, 52, and front and rear shock absorbers 58, 60 respectively pivotally coupled between the support platform 16 and the outer ends 54A, 56A of the front and rear crank arms 54, 56. The front and rear shock absorbers 58, 60 independent of each other extend and retract in a conventionally known controlled manner and within predetermined limits in response to pivotal movement of the respective forward and rearward suspension structures 38, 40 so as to independently regulate the articulating of the front and rear suspension assemblies 22, 24.

Referring now to FIGS. 6 and 7, in the second exemplary embodiment of the vehicle 10, the above-described forward and rearward suspension structures 38, 40 and the front and rear lift generating mechanisms 42, 44 have modified configurations compared to those described above with reference to the first exemplary embodiment of the vehicle 10, as shown in FIGS. 1 and 2. However, it should be understood that the functioning or operation of the front and rear suspension assemblies 22, 24 are substantially the same for the two exemplary embodiments of the vehicle 10. In FIGS. 6 and 7, the respective forward and rearward suspension structures 38, 40 of the front and rear suspension assemblies 22, 24 take the form of respective elongated dual front arms 62 and elongated dual rear arms 64. The dual front arms 62 have laterally spaced apart rearward end portions 62A, a combined forward end portion 62B, and a combined intermediate portion 62C attached between and merging with them. The dual rear arms 64 have laterally spaced apart rearward end portions 64A, laterally spaced apart forward end portions 64B, and a cross arm 66 extending between and rigidly interconnecting intermediate portions 64C of the dual rear arms 64 attached between and merging with the rearward and forward end portions 64A, 64B. The rearward end portions 62A of the dual front arms 62 and the forward end portions 64B of the dual rear arms 64 are pivotally mounted to the support platform 16 via fixed attachments to opposite ends 68A, 70A of respective front and rear cross shafts 68, 70 of the front and rear suspension assemblies 22, 24. The front and rear cross shafts 68, 70, which respectively define the front and rear pivotal axes 30, 32, are rotatably mounted to the support platform 16 at transverse location between the space provided for the motive power source 14 and the forward and rearward sites 26A, 26B for receiving the feet of the operator. The rearward end portions 62A of the dual front arms 62 extend forward from the front cross shaft 68 to their forward end portions 62B. The forward end portions 64B of the dual rear arms 64 extend rearward from the rear cross shaft 70 to their rearward end portions 64A. In response to the front and rear ground surface contacting members 18, 20 encountering uneven terrain, and independent of one another, the dual front and rear arms 62, 64 at their respective forward end portion 62B and rearward end portions 64A are moved vertically as the front cross shafts 68, 70 are rotated about the respective front and rear pivotal axes 30, 32 relative to the support platform 16. The rearward end portions 62A and the combined forward end portion 62B of the dual front arms 62 have respective substantially straight configurations, and the combined intermediate portion 62C rigidly interconnecting them has a substantially curved angular configuration. The forward and rearward end portions 64B, 64A of the dual rear arms 64 have respective substantially straight configurations, and the intermediate portions 64C rigidly interconnecting them have substantially shallow V-shaped configurations.

In FIGS. 6 and 7, the front and rear lift generating mechanism 42, 44 of the respective front and rear suspension assemblies 22, 24 respectively pivotally couple the front and rear suspension structures 38, 40 (the dual front and rear arms 62, 64 via the front and rear cross shafts 68, 70) to the support platform 16. The pivotal couplings allow the support platform 16 to be urged into and assume the given position spaced above ground surface 36 while being yieldable to permit independent vertical pivotal movement of each of the front and rear suspension structures 38, 40 within the given range relative to the support platform 16, the same as seen in FIGS. 3 and 4 with respect to the first exemplary embodiment of the vehicle 10. The front and rear lift generating mechanisms 42, 44 include a superstructure 72 fixedly mounted to the support platform 16, and front and rear shock absorbers 74, 76. The superstructure 72 extends above the support platform 16 such that the respective shock absorbers 74, 76 are pivotally coupled between the superstructure 72 and the respective rearward end portion 62A of one of the dual front arms 62 and the forward end portion 64B of one of the dual rear arms 64 via respective connectors 78, 80 fixedly attached on the respective one dual front arm 62 and one dual rear arm 64. The front and rear shock absorbers 74, 76 independent of each other extend and retract in a conventionally known controlled manner and within predetermined limits in response to pivotal movement of the respective forward and rearward suspension structures 38, 40 so as to independently regulate the articulating of the front and rear suspension assemblies 22, 24.

From the above description, it will be understood that the front and rear lift generating mechanisms 42, 44 thus regulate pivotal movement of the respective front and rear suspension assemblies 22, 24, and the respective front and rear ground surface contacting members 18, 20, so as to allow such pivotal movement within a given range relative to the support platform 16 and thereby enable the front and rear ground surface contacting members 18, 20 to follow large variance in surface or terrain conditions. At the same time the action of the front and rear lift generating mechanisms 42, 44 ensures that the support platform 16 will return back to the given position as the surface variances diminish. The given position in the erect operating mode of the vehicle 10 can be viewed as a normal riding position in which the support platform 16 with the operator standing thereon is elevated and spaced above the ground surface 36. As uneven terrain is followed by the front and rear ground surface contacting members 18, 20, the front and rear suspension assemblies 22, 24 pivotally move relative to the support platform 16 within the given range and the support platform 16 assumes temporarily one of multiple possible displaced riding positions located either above or below the normal riding position. However, the front and rear lift generating mechanisms 42, 44 apply force to cause counter pivotal movement of one or both of the front and rear suspension assemblies 22, 24 relative to the support platform 16 to return the support platform 16 back toward the normal riding position as the front and rear ground surface contacting members 18, 20 encounter level surface terrain.

Figure 5:
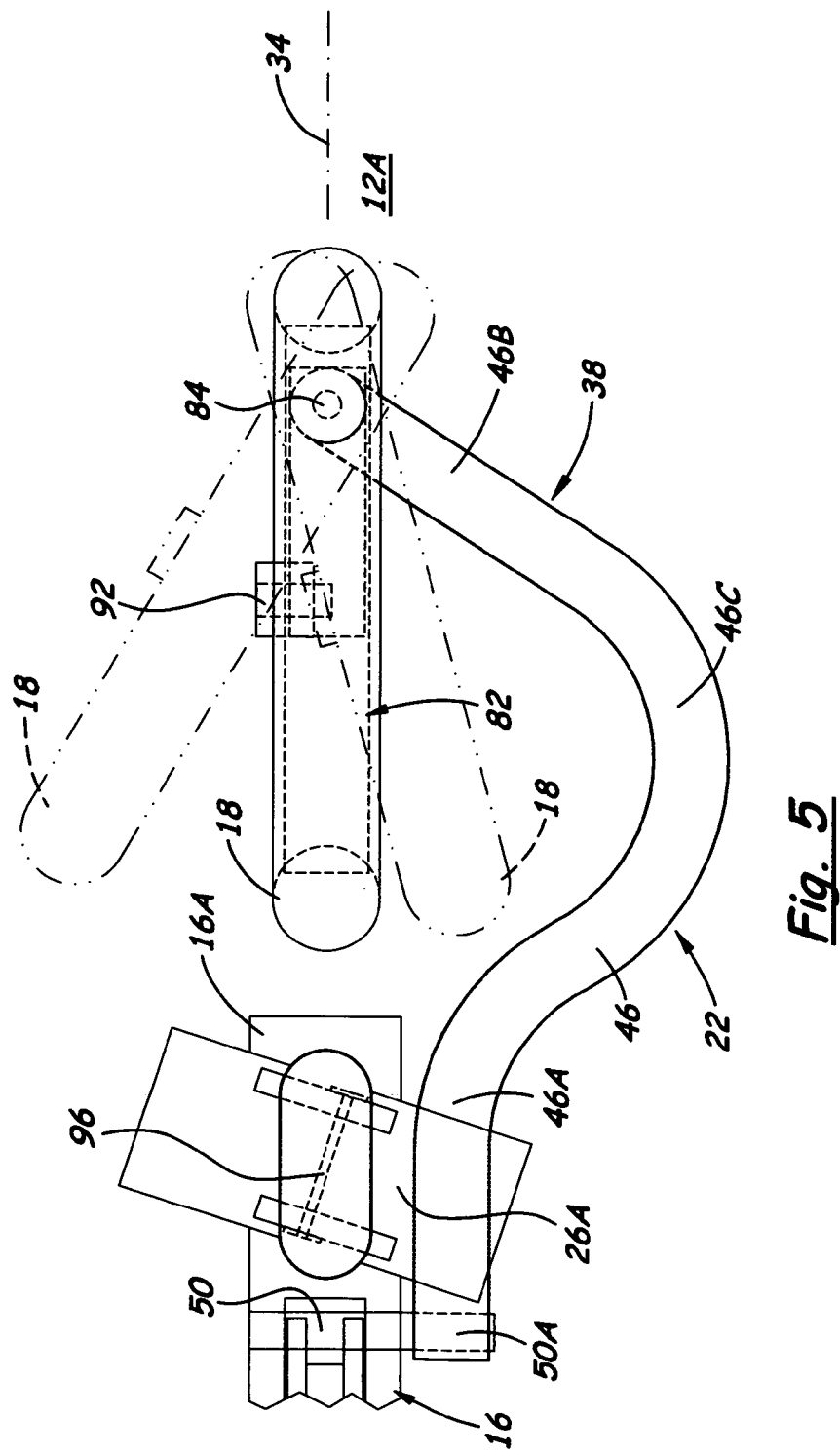
FIG. 5 is a top plan view of a front end portion of the vehicle of FIG. 2 showing a range of steerable movement of a front steering mechanism of the vehicle and a front ground surface contacting member rotatably mounted to the steering mechanism.

Referring again to FIGS. 1, 2, 6 and 7, the front suspension assembly 22 of the vehicle chassis 12 in both exemplary embodiments also supports the front ground surface contacting member 18 so as to be steerable horizontally relative to the support platform 16 and the ground surface 36. For achieving this capability, the front suspension assembly 22 includes a front steering mechanism 82 being pivotally mounted to the forward suspension structure 38 of the front suspension assembly 22. The front steering mechanism 82 is movable sideways about an axis 84 toward and away from the forward suspension structure 38, such as seen in FIG. 5 with respect to the first exemplary embodiment of the vehicle 10 and the laterally spaced single front arm 46. The axis 84 is oriented at a forwardly tilted or inclined angle relative to both vertical and horizontal references and is disposed forwardly of a location 36A where the front ground surface contacting member 18 contacts the ground surface 36. With the vehicle 10 loaded by the operator's weight, an advantageous angle of the axis 84 with the vertical reference has been found to be about 85 degrees. The front steering mechanism 82 also mounts the front ground surface contacting member 18 so as to dispose it adjacent to a side of the front steering mechanism 82 and movable over the ground surface concurrently as the front ground surface contacting member 18 with the front steering mechanism 82 is steerable side-to-side or sideways relative to the vehicle chassis 12 and the ground surface 36. With the front ground surface contacting member 18 aligned or centered with the longitudinal axis 34 of the vehicle 10, the forward suspension structure 38 is disposed at an acute angle of about thirty to forty degrees with the front ground surface contacting member 18 and the steering mechanism 82. This acute angle determines the range of pivotal movement of the member 18 and steering mechanism 82 toward the forward suspension structure 38. Suitable abutments (not shown) are provided on the steering mechanism 82 that limit the pivotal movement of the member 18 and steering mechanism 82 to a similar acute angle away from the centered alignment with the longitudinal axis 34. The actuation of the front steering mechanism 82, and thus the steering of the front ground surface contacting member 18, is carried out by operators shifting their weight and center of gravity of the vehicle 10 while standing on the support platform 16 so as to control the sideways tilting of the vehicle 10 as the vehicle 10 is moving over the ground surface 36.

In both exemplary embodiments of the vehicle 10, the front steering mechanism 82 includes at least one elongated member 86 extending along the respective forward end portion 46B, 62B of the front suspension structure 38 and a transverse shaft 88 extending between and pivotally mounting the at least one elongated member 86 at a leading end 86A thereof to the respective forward end portion 46B, 62B of the front suspension structure 38. The transverse shaft 88 defines the non-horizontal axis 84. The front ground surface contacting member 18 is mounted to the front steering mechanism adjacent to a trailing end 86B of the at least one elongated member 86. More particularly, the front steering mechanism 82 has a pair of elongated members 86 spaced apart from each other and extending substantially parallel to one another and along opposite upper and lower sides of the respective forward end portion 46B, 62B of the front suspension structure 38. The transverse shaft 88 extends between and pivotally mounts the pair of elongated members 86 at their leading ends 86A to the forward end portion 4B, 62B of the front suspension structure 38. A cross member 90 extends between and rigidly interconnects the pair of elongated members 86 at their trailing ends 86B and is adapted to mount the front ground surface contacting member 18 adjacent to a side of the front steering mechanism 82 and of the forward end portion 46B, 62B of the front suspension structure 38. In the case where the front ground surface contacting member 18 is a rotatable wheel, the front steering mechanism 82 mount the front ground surface contacting wheel 18 about a front axis 92 oriented transversely and rearward relative to the forwardly-tilted axis 84 of the front steering mechanism 82.

As hereinbefore explained, the forwardly-tilted orientation of the front steering mechanism 82 pivotal axis 84 and the placement thereof forwardly of the ground surface contact location 36A enables the steering of the front ground contacting member 18, relative to the front suspension assembly 22, the support platform 16 and the ground surface 36. The steering of the contacting member 18 thereby allows the steering of the vehicle 10 toward a desired direction of travel by the operator positioning theirself on the support platform 16 and shifting and applying their weight so as to dynamically control the center of gravity of the vehicle 10 in the fore-and-aft, up-and-down, and side-to-side directions. More particularly, the angular orientation of the forwardly-tilted axis 84, about which the elongated members 86 of the steering mechanism 82 pivot at their leading ends 86A, is such that when vehicle 10 is leaned toward one side, the steering mechanism 82 and the front ground surface contacting member 18 coupled to the trailing ends 86B of the elongated members 86 of the steering mechanism 82 will turn toward the other side, and thus away from the direction of the lean, and cause the vehicle 10 to steer into the direction of the lean. The particular angle of the axis 84 relative to the longitudinal axis 34 of the vehicle 10 will vary with the articulation of the forward suspension structure 38 of the front suspension assembly 22. The length and angle of the front steering mechanism 82 have a predetermined relationship that allows the front ground surface contacting member 18 to respond to the steering input by the operator yet allow the vehicle 10 to maintain stability of direction of travel while traveling over both smooth and rough terrain, while the front suspension assembly 22 articulates and while accelerating or slowing. Also, as apparent in FIGS. 1 and 6, the axis 84 is located forwardly of the location of ground surface contact 36A of the front ground surface contacting member 18 and also forwardly of the front axis 92 at which the front ground surface contacting member 18 is mounted to the front steering mechanism 82. By way of example, the forwardly-tilted axis 84 may vary in angle by up to 55 degrees, ranging from 55 degrees to 110 degrees with articulation of the forward suspension structure 38 with respect to the support platform 16 when viewed from the side. Further, the axis 84 may be allowed to pivot or it may be held substantially perpendicular with respect to the horizontal plane of support platform 16. Also, the location of axis 84 allows the vehicle 10 to negotiate angles of approach and departure of 60 to 85 degrees depending on the configuration of the front ground surface contacting member 18, while also allowing the forward and rearward suspension structures 38, 40 to pivot within a given range of from about 10 degrees to about 30 degrees with respect to the support platform 16, keeping the pivot axis 84 from contacting the ground surface or obstacles. Such range of pivoting of the forward and rearward suspension structures 38, 40 allows the ground surface contacting members 18, 20 to follow abrupt and severe surface variances and to absorb and dampen forces due to gravity, impacts, acceleration, and slowing, and aids in maintaining traction.

From the above description of the mobile chassis 12, it will also be understood that the front and rear support assemblies 22, 24 place the ground surface contacting members 18, 20 one behind the other along the longitudinal axis 34 of the vehicle 10 and at the opposite ends thereof, which aids fore and aft balance and directional stability of the vehicle 10. The front and rear ground surface contacting members 18, may be rotatably mounted wheels, as shown in FIGS. 1, 2, 6 and 7. Alternatively, the front surface contacting member 18 may be ski and/or the rear ground surface contacting member 20 may be an endless track such as, for instance, employed by a skimobile. When rotatable wheels are employed the front and rear ground surface contacting members 18, 20 rotatable about respective axes extending substantially transverse to the longitudinal axis 34 of the vehicle 10 and the members 18, 20 make such engagement with the ground surface 36 sufficient to enable movement of the vehicle 10 in a given direction of travel. The rear ground surface contacting member 20 is mounted by a rear axle 94 attached to and extending sideways from the rearward end portion 48A of the single rear arm 48 of the rearward suspension structure 38 in the first exemplary embodiment of the vehicle 10 as seen in FIG. 2 or is mounted by the rear axle 94 attached to and extending transversely between the rearward end portions 64A of the respective dual rear arms 64 of the rearward suspension structure 38 in the second exemplary embodiment of the vehicle 10 as seen in FIG. 7.

As shown in FIGS. 1, 2, 6 and 7, in both exemplary embodiments of the vehicle 10, the motive power source 14 is mounted on the support platform 16 at a location thereon that is generally centrally located between the front and rear ends 12A, 12B of the mobile chassis 12. The support platform 22 defines or provides sufficient space to so locate and mount the motive power source 14 thereon. The support platform 22 can have any suitable construction and configuration, for example, comprised of tubes and/or plates preferably made of metal by employing suitable conventional manufacturing and fabrication techniques. Further, the support platform 12 has the forward and rearward sites 26A, 26B at the opposite sides, such as fore and aft, of the space for the motive power source 14, providing sufficient space for the attachment of suitable devices, such as bindings 96, 98, to the support platform 12. The bindings 96, 98 are of such design that the operator can mount the support platform 16 at a side of the vehicle 10 and step into the bindings 96, 98 as the vehicle 10 is leaning, but is nearly upright, against a suitable adjacent structure. The operator will then be standing on the support platform 16, straddling the motive power source 14. An operator binding system may be employed that allows the operator to manually hold fast to or release from the vehicle 10. Such binding system may or may not be operator actuated. If such system is operator actuated, a manual and/or electrical and/or electronic and/or remote controller may be provided for the binding system.

The operator and the motive power source 14 are thus substantially centrally located on the support platform 16 in order to centralize mass and center of gravity and thereby increase maneuverability of the vehicle 10. Operators mount the vehicle 10 in a standing position with their feet placed in the bindings 96, 98 for maximum leverage to maintain balance and control. As mentioned earlier, operators are required to lean side-to-side to shift their weight and the center of gravity of the vehicle 10 in order to steer the vehicle 10. This mode of operation allows operators to keep their arms free to help maintain balance or perform other tasks, such as carry items or operate other devices such as tools or firearms. The operator can stand sideways as in surfing or facing forward as in skiing in which latter case the bindings 94, 96 would be located at the opposite lateral sides of the motive power source 14. By way of an example, the support platform 16 will allow operators to stand thereon with their feet positioned at a center-to-center distance of at least about a third of an average operator's height (or about 22 inches for an operator about 66 inches tall), allowing the operator the necessary leverage to maintain balance while negotiating uneven or varying surfaces, accelerating, slowing and experiencing severe gravitational and impact forces. The geometry and operation of the front steering mechanism 82 varies with actuation and articulation of the front and rear suspension assemblies 22, 24 and/or shifting of the fore and aft weight of the operator so as to allow the operator to vary responsiveness of front steering mechanism 82 during operation of vehicle 10.

It was mentioned earlier that the vehicle 10 has an operator-interfaced arrangement extending between and coupling the motive power source 14 and the rear ground surface contacting member 20 so as to enable control of transmission of self-propelling power to and motion by the rear ground contacting member 20. The motive power source 14 can be a suitable internal combustion engine with a fuel tank or a suitable electric motor with a battery. The operator-interfaced arrangement encompasses a motive power or drive motion transmission system 100 on the vehicle 10 that extends along a side of the vehicle 10, as seen in FIGS. 1 and 6, and drivingly couples between the motive power source 14 and the rear ground surface contacting member 20 to provide the self-propulsion capability of the vehicle 10. The motive power source 14 generates rotary motion at an output drive shaft 102 which is transmitted by a train of gears 104 and chains 106, coupled one to the next and operatively supported by the support platform 16, rearward suspension structure 38 and rear ground support contacting member 20, from the output drive shaft 102 to the rear ground surface contacting member 20 so as to self-propel the vehicle 10 across the ground surface 36. The drive motion transmission system 100 may incorporate various combinations of one or several items including belts, chains, hydraulics, pulleys, gears, cogs, clutches, torque converters, shafts, joints or propellers.

Also, the operator-interfaced arrangement encompasses a motion braking system 108 coupled to the rear ground surface contacting member 20 on the vehicle 10. The motion braking system 108 includes a brake device 110 mounted to, and operable in cooperation with, the rear ground surface contacting member 20 to reduce and/or stop the movement of the vehicle 10 on the command of the operator as conveyed, for example, through use of a hand-held remote control device 28, as shown in FIG. 1A. The hand-held remote control device 28 may be manual and/or electrical and/or electronic in nature for controlling the operation of the motive power source and the brake device in any suitable manner.

From the foregoing description, it will be readily understood that the steerable self-propelled vehicle 10 provides a reliable transportation resource to serve recreational, occupational and other pressing needs. The vehicle 10 in accordance with the present invention allows an operator to travel up, down and over inclined and flat, smooth or rough surfaces and obstacles at speed for extended periods, with the operator needing only to shift their weight to steer and balance the vehicle while standing and maintaining freedom of movement of their arms to aid in balance or perform tasks. The vehicle 10 can accommodate steep angles of approach and departure. The operator's is allowed to stand with their feet positioned for maximum leverage to aid in balance, absorption of impacts and maneuverability. The vehicle 10 in view of its various aspects described hereinbefore will deliver enhanced fuel efficiency and can itself be readily and easily transported and stored.

It will be recognized that in the above description that the terms "front" and "rear" and "forward" and "backward" have been used to describe the arrangement of the vehicle with its steering at the front and its drive at the rear as shown in the drawings. However it should be understood that this relationship may be reversed within the scope of the present invention. In other words, the steering can be at the rear and the drive at the front within the contemplation of the present invention.

It is thought that the present invention and its advantages will be understood from the foregoing description and it will be apparent that various changes may be made thereto without departing from the spirit and scope of the invention or sacrificing all of its material advantages, the form hereinbefore described being merely a preferred or exemplary embodiment thereof.

What is claimed is:

1. An articulated steerable mobile chassis for a vehicle, comprising:
    a support platform providing space for mounting a motive power source;
    a first ground surface contacting member;
    a second ground surface contacting member;
    a first suspension assembly pivotally mounted to and extending in a first direction from said support platform and articulately connecting said support platform to said first ground surface contacting member at a location spaced in said first direction from said support platform so as to vertically suspend said support platform with respect to said first ground surface contacting member and thereby to enable said first ground surface contacting member to dynamically engage the ground surface, said first suspension assembly also supporting said first ground surface contacting member to be steerable and movable relative to the ground surface; and
    a second suspension assembly pivotally mounted and extending in a second direction from said support platform and articulately connecting said support platform to said second ground surface contacting member at a location spaced in said second direction from said support platform so as to vertically suspend said support platform with respect to said second ground surface contacting member and thereby to enable said second ground surface contacting member to dynamically engage the ground surface, said second suspension assembly also supporting said second ground surface contacting member to be movable relative to the ground surface;
    said first and second suspension assemblies also respectively supporting said first and second ground surface contacting members to be vertically movable with said first and second suspension assemblies relative to said support platform so as to dynamically suspend said support platform at a given position spaced above the ground surface and thus place the chassis in an erect operating mode in which said first and second suspension assemblies can undergo independent vertical deflection within a given range relative to said support platform to thereby allow said first and second ground surface contacting members to follow uneven ground surface as said first and second suspension assemblies absorb impacts generated therefrom and said support platform temporarily moves to positions closer to and farther from the ground surface than the given position;
    said support platform having sites at opposite sides of the space for the motive power source where an operator's feet can be placed to enable the operator to mount said support platform and to steer said first ground surface contacting member;
    wherein said first suspension assembly includes a first suspension structure having opposite first and second end portions and being pivotally mounted at said second end portion to said support platform and extending in said first direction from said support platform so as to be movable vertically at said first end portion relative to said support platform;
    wherein said first suspension assembly further includes a steering mechanism pivotally mounted at said first end portion of said first suspension structure so as to be movable sideways relative to said first suspension structure and said support platform, said steering mechanism adapted to mount said first ground surface contacting member and dispose said first ground surface contacting member adjacent to said steering mechanism and said first end portion of said first suspension structure;
    wherein said steering mechanism includes at least one elongated member extending along said first end portion of said first suspension structure and a transverse shaft extending between and pivotally mounting said elongated member about a forward-tilted axis at a leading end of said elongated member to said first end portion of said first suspension structure, said first ground surface contacting member being mounted to said steering mechanism adjacent to a trailing end of said elongated member.

2. The chassis of claim 1, wherein said first suspension assembly further includes a first lift generating mechanism pivotally coupling said second end portion of said first suspension structure to said support platform so as to urge said support platform to assume said given position spaced above the ground surface while being yieldable to permit vertical pivotal movement of said first suspension structure relative to said support platform within said given range relative to said given position.

3. The chassis of claim 2 wherein said first lift generating mechanism includes a shock absorber pivotally coupled between said support platform and said second end portion of said first suspension structure.

4. The chassis of claim 3 wherein said first lift generating mechanism further includes a superstructure mounted to said support platform and extending above said support platform such that said shock absorber is pivotally coupled between said superstructure and said second end portion of said first suspension structure.

5. The chassis of claim 1 wherein said first suspension structure includes an elongated arm in which said first and second end portions of said first suspension structure have substantially straight configurations and are rigidly interconnected by an intermediate portion having a substantially curved angular configuration.

6. The chassis of claim 1 wherein said second suspension assembly includes a second suspension structure having opposite first and second end portions and being pivotally mounted at said first end portion to said support platform and extending in said second direction from said support platform so as to be movable vertically at said second end portion relative to said support platform.

7. The chassis of claim 6 wherein said second suspension assembly further includes a second lift generating mechanism pivotally coupling said first end portion of said second suspension structure to said support platform so as to urge said support platform to assume said given position spaced above the ground surface while being yieldable to permit vertical pivotal movement of said second suspension structure relative to said support platform within said given range relative to said given position.

8. The chassis of claim 7 wherein said second lift generating mechanism includes a shock absorber pivotally coupled between said support platform and said first end portion of said second suspension structure.

9. The chassis of claim 8 wherein said second lift generating mechanism further includes a superstructure mounted to said support platform and extending above said support platform such that said shock absorber is pivotally coupled between said superstructure and said first end portion of said second suspension structure.

10. The chassis of claim 6 wherein said second suspension structure includes an elongated arm in which said first and second end portions of said second suspension structure are rigidly interconnected by an intermediate portion which provides said second suspension structure with a shallow V-shaped configuration.

11. An articulated steerable mobile chassis for a vehicle, comprising:
a support platform providing space for mounting a motive power source;
a first ground surface contacting wheel;
a second ground surface contacting wheel;
a first suspension assembly rotatably mounting said first ground surface contacting wheel for rotatable movement over the ground surface, said first suspension assembly being pivotally mounted, and vertically movable relative, to said support platform and extending in a first direction from said support platform so as to space said first ground surface contacting wheel in said first direction from said support platform, and vertically movable with said first suspension assembly relative to said support platform to absorb impact with uneven ground surface, and steerable over the ground surface; and
a second suspension assembly rotatably mounting said second ground surface contacting wheel for rotatable movement over the ground surface, said second suspension assembly being pivotally mounted, and vertically movable relative, to said support platform and extending in a second direction from said support platform so as to space said second ground surface contacting wheel in said second direction from said support platform and vertically movable with said second suspension assembly relative to said support platform to absorb impact with uneven ground surface;
said first and second suspension assemblies also being coupled to said support platform so as to urge said support platform to assume a given position spaced above the ground surface and thus place said chassis in an erect operating mode while permitting said first and second suspension assemblies to yield and vertically move relative to said support platform within a given range to thereby allow said first and second ground surface contacting wheels to follow uneven ground surface and said support platform to temporarily move to positions closer to and farther away from the ground surface than said given position;
said support platform having sites at opposite sides of the space for the motive power source where an operator's feet can be placed to enable the operator to stand on said support platform and straddle the space for the motive power source and further to enable a shift of weight distribution by the operator to steer said first ground surface contacting wheel;
wherein said first suspension assembly further includes a steering mechanism pivotally mounted at a first end portion of a first suspension structure of said first suspension assembly so as to be movable sideways relative to said first suspension structure and to said support platform, said steering mechanism rotatably mounting said first ground surface contacting wheel adjacent to said steering mechanism and said first end portion of said first suspension structure such that said first ground surface contacting wheel is movable over the ground surface concurrently as said first ground surface contacting wheel is steerable horizontally relative to said support platform and the ground surface by the weight distribution shifting by the operator;
wherein said steering mechanism includes at least one elongated member extending along said first end portion of said first suspension structure and a transverse shaft extending between and pivotally mounting said elongated member about a forward-tilted axis at a leading end of said elongated member to said first end portion of said first suspension structure, said first ground surface contacting member being mounted to said steering mechanism adjacent to a trailing end of said elongated member.

12. The chassis of claim 11 wherein said first and second suspension assemblies respectively include first and second lift generating mechanisms which independently of one another pivotally couple first and second suspension structures of said first and second suspension assemblies respectively to first and second portions of said support platform so as to urge said support platform to assume said given position spaced above the ground surface while being yieldable to permit vertical pivotal movement of said first and second suspension structures independent of one another relative to said support platform within said given range relative to said given position.

13. The chassis of claim 12 wherein said first and second lift generating mechanisms respectively include shock absorbers pivotally coupled between said support platform and a corresponding one of said first and second suspension structures.

14. The chassis of claim 13 wherein said first and second lift generating mechanisms further include a superstructure mounted to said support platform and extending above said support platform such that said shock absorbers are pivotally coupled between said superstructure and a corresponding one of said first and second suspension structures.

15. An articulated steerable self-propelled vehicle, comprising:
a motive power source;
a support platform mounting said motive power source;
a first ground surface contacting member;
a second ground surface contacting member;

a first suspension assembly pivotally mounted to and extending in a first direction from said support platform and articulately connecting said support platform to said first ground surface contacting member at a location spaced in said first direction of said support platform so as to vertically suspend said support platform with respect to said first ground surface contacting member and thereby to enable said first ground surface contacting member to dynamically engage the ground surface, said first suspension assembly also supporting said first ground surface contacting member to be steerable over the ground surface;

a second suspension assembly pivotally mounted and extending in a second direction from said support platform and articulately connecting said support platform to said second ground surface contacting member at a location spaced in said direction from said support platform so as to vertically suspend said support platform with respect to said second ground surface contacting member and thereby to enable said second ground surface contacting member to dynamically engage the ground surface, said second suspension assembly also supporting said second ground surface contacting member to be movable relative to the ground surface;

said first and second suspension assemblies also respectively supporting said first and second ground surface contacting members to be vertically movable with said first and second suspension assemblies relative to said support platform so as to dynamically suspend said support platform at a given position spaced above the ground surface and thus place said vehicle in an erect operating mode in which said first and second suspension assemblies can undergo independent vertical deflection within a given range relative to said support platform to thereby allow said first and second ground surface contacting members to independently follow uneven ground surface as said first and second suspension assemblies absorb impacts generated therefrom and said support platform temporarily moves to positions closer to and farther from the ground surface than the given position;

said support platform having sites at opposite sides of said motive power source where an operator's feet can be placed to enable the operator to stand on said support platform and straddle said motive power source and further to shift distribution of weight of the operator on said support platform to thereby steer said first ground surface contacting member; and an operator-interfaced arrangement extending between and coupling said motive power source and said second ground surface contacting member so as to enable control of transmission of power to and motion by said second ground contacting member;

wherein said first suspension assembly includes a first suspension structure having opposite first and second end portions and being pivotally mounted at said second end portion to said support platform and extending in said first direction from said support platform so as to be movable vertically at said first end portion relative to said support platform;

wherein said first suspension assembly further includes a steering mechanism pivotally mounted at said first end portion of said first suspension structure so as to be movable sideways relative to said first suspension structure and said support platform, said steering mechanism adapted to mount the first ground surface contacting member and dispose the first ground surface contacting member adjacent to said steering mechanism and said first end portion of said first suspension structure such that the first ground surface contacting member is movable over the ground surface concurrently as the first ground surface contacting member is steerable horizontally relative to said support platform and the ground surface;

wherein said steering mechanism includes at least one elongated member extending along said first end portion of said first suspension structure and a transverse shaft extending between and pivotally mounting said elongated member about a forward-tilted axis at a leading end of said elongated member to said first end portion of said first suspension structure, said first ground surface contacting member being mounted to said steering mechanism adjacent to a trailing end of said elongated member.

16. The vehicle of claim 15 wherein said first suspension assembly further includes a first lift generating mechanism pivotally coupling said second end portion of said first suspension structure to said support platform so as to urge said support platform to assume said given position spaced above ground surface while being yieldable to permit vertical pivotal movement of said first suspension structure relative to said support platform within said given range relative to said given position.

17. The vehicle of claim 16 wherein said first lift generating mechanism includes a shock absorber pivotally coupled between said support platform and said second end portion of said first suspension structure.

18. The vehicle of claim 17 wherein said first lift generating mechanism further includes a superstructure mounted to said support platform and extending above said support platform such that said shock absorber is pivotally coupled between said superstructure and said second end portion of said first suspension structure.

19. The vehicle of claim 15 wherein said first suspension structure includes an elongated arm in which said first and second end portions of said first suspension structure have substantially straight configurations and are rigidly interconnected by an intermediate portion having a substantially curved angular configuration.

20. The vehicle of claim 15 wherein said second suspension assembly includes a second suspension structure having opposite first and second end portions and being pivotally mounted at said first end portion to said support platform and extending in said second direction from said support platform so as to be movable vertically at said second end portion relative to said support platform.

21. The vehicle of claim 20 wherein said second suspension assembly further includes a second lift generating mechanism pivotally coupling said first end portion of said second suspension structure to said support platform so as to urge said support platform to assume said given position spaced above the ground surface while being yieldable to permit vertical pivotal movement of said second suspension structure relative to said support platform within said given range relative to said given position.

22. The vehicle of claim 21 wherein said second lift generating mechanism includes a shock absorber pivotally coupled between said support platform and said first end portion of said second suspension structure.

23. The vehicle of claim 22 wherein said second lift generating mechanism further includes a superstructure mounted to said support platform and extending above said support platform such that said shock absorber is pivotally coupled between said superstructure and said first end portion of said second suspension structure.

24. The vehicle of claim 20 wherein said second suspension structure includes an elongated arm which said first and second end portions of said second suspension structure are rigidly interconnected by an intermediate portion which provides said second suspension structure with a shallow V-shaped configuration.

* * * * *